United States Patent
Vala et al.

(10) Patent No.: US 6,251,203 B1
(45) Date of Patent: Jun. 26, 2001

(54) APPARATUS AND METHOD FOR ASSEMBLING A PLASTIC CONTAINER FOR FOOD PRODUCTS

(75) Inventors: Warren Vala, Plymouth; Terry Reishus, Eagan, both of MN (US); Thomas Zopf; Hans Konle, both of Clearwater, FL (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/339,074

(22) Filed: Jun. 23, 1999

(Under 37 CFR 1.47)

(51) Int. Cl.[7] .................................................... B32B 31/16
(52) U.S. Cl. ................... 156/73.1; 156/580.1; 156/580.2
(58) Field of Search ........................ 156/69, 73.1, 580.1, 156/580.2; 264/442, 443, 445; 425/174.2

(56) References Cited

U.S. PATENT DOCUMENTS

| | | | | |
|---|---|---|---|---|
| 4,769,095 | * | 9/1988 | Sager ..................................... | 156/69 |
| 5,152,438 | * | 10/1992 | Gordon et al. ....................... | 222/546 |
| 5,155,971 | * | 10/1992 | Zopf ..................................... | 53/432 |
| 6,083,333 | * | 7/2000 | Van Beers et al. .................. | 156/73.1 |
| 6,085,489 | * | 7/2000 | Bachner et al. ..................... | 53/410 |

* cited by examiner

Primary Examiner—James Sells
(74) Attorney, Agent, or Firm—John A. O'Toole; Douglas J. Taylor; Thomas A. Rendos

(57) ABSTRACT

A manufacturing apparatus and method for assembling a food container having a body portion with an annular rim configured to be secured to an annular rim of a base portion of the container. The manufacturing apparatus and method includes a container supporting assembly, a tool member, a drive assembly, an oscillator assembly and a suspension assembly. The container supporting assembly supports the body and base portions of the container with the annular rim of the base portion engaging the annular rim of the body portion. The drive assembly moves the tool member along a first axis between a first position, wherein the tool member is engaged with the annular rim of the base portion, and a second position, wherein the tool member is disengaged therefrom. The oscillator assembly oscillates the tool member relative to the container supporting assembly to cause oscillation of the base and body portions relative to one another. This oscillation generates enough heat to melt areas of contact between the annular rims to join the base portion and the body portion. The suspension assembly supports the tool member for pivotal movement about a second axis orthogonal to the first axis to accommodate inaccuracies in the annular rims of the base and body portions and misalignment of the container components within the container supporting assembly.

39 Claims, 7 Drawing Sheets

APPARATUS AND METHOD FOR ASSEMBLING A PLASTIC CONTAINER FOR FOOD PRODUCTS

FIELD OF THE INVENTION

The present invention relates to apparatus and methods for assembling components of thermoplastic food containers. In particular, the present invention is an apparatus and method for ultrasonically welding together a base portion and a body portion of a container. The apparatus and method employs a self leveling ultrasonic welding horn that accommodates inaccuracies in and misalignment of the base and body portions of the container.

BACKGROUND OF THE INVENTION

One area where the use of plastic containers has become widespread is in the food packaging industry. Accordingly, it is common for these plastic food containers to serve as the end display package in which the product is presented for sale to the customer. Typical of these containers are those used for dairy products such as cottage cheese, sour cream, yogurt or the like where an integral body of the container is provided having a sidewall that tapers down to an integral transverse bottom wall with the top opening being closed by a plug fit lid. Normally, the lid has a depending peripheral skirt which locks onto the upper rim of the tapered wall of the container body. Many of these food product plastic containers have their parts formed by a thermoforming process. In thermoforming, a thin plastic sheet is formed into the desired shape by heating and forcing the sheet against a mold to produce a container part having a uniform, very thin, cross-sectional thickness and flexible walls.

In addition to the food product container having the downwardly tapering sidewall and the plug fit lid, there is currently available thermoformed containers that have a reverse tapered sidewall with a larger diameter bottom. This type of thermoformed plastic food container is typically used to package yogurt, e.g., flavored yogurt. Generally, this reversed taper sidewall type container has three main components. These three components are a body portion better known as a sleeve member, a base portion better known as a bottom closure member and a removable lid member. The sleeve member is the part of the food container that forms the reversed taper sidewall of the container itself. This sleeve member is thermoformed so that it is open at both its smaller diameter top and at its larger diameter bottom. The separate bottom closure member is also formed by thermoforming and is attached to the sidewalls of the sleeve member by a spinwelding process to close off the open, larger diameter bottom of the sleeve member. The bottom closure member includes a base panel and depending skirt wall which is the portion of the bottom closure member that is spinwelded to an interior surface of the sidewall of the sleeve member to permanently attach the pieces together. Once permanently attached, the sleeve member and bottom closure member defines the food container and as such can be filled with the flavored yogurt. Unlike the previously described plug fit top closure lids which are designed to be opened, the bottom closure member for this particular yogurt container does not have a locking skirt which locks onto a rim of the sidewall and which can be opened to gain access to the food therein. Instead, after being filled with yogurt, the open, smaller diameter top of the sleeve member is closed by the removable lid member. This removable lid member typically is a flexible foil seal that is secured about the open, smaller diameter top of the sleeve member of the container by an adhesive. To gain access to the yogurt, the flexible foil seal is peeled open from over the smaller diameter opening at the top of the container sidewall.

This thermoformed and spinwelded yogurt container as described above suffers from numerous shortcomings. Foremost is that this spinwelding technique requires specialized handling and filling equipment that results in a relatively slow production of containers for filling. For example, to spinweld the bottom closure member to the reversed tapered sidewall of the sleeve member, both of these components need to be thermoformed with integral gripping lugs. These integral gripping lugs must project relatively far radially inward relative to the sleeve member sidewall and the bottom closure member skirt wall so that they can be grasped by the spinwelding equipment for rotating the two parts relative to each other to create a frictional heating for welding the parts together. The bottom closure has these lugs formed near a lower edge of its skirt wall, while the sleeve member sidewall lugs are formed near the smaller diameter open top of the sleeve member. In order to grasp these lugs, the container component handling equipment, the spinwelding equipment and the container filling equipment must operate at a relatively slow rate of speed to insure that the components of the container and the completed container itself are properly assembled and filled. Moreover, because of the complexity of machines required to accommodate the spinwelding lugs and inaccuracies in the container components due to the thermoforming process, the bottom closure and sleeve members are susceptible to relative misalignment which results in the assembling of containers that are at best misshapen and not aesthetically pleasing from a consumers point of view and at worst not fluid tight.

Since the sleeve and bottom closure members of the above-described yogurt container are thermoformed parts having a constant wall thickness, these radially inward projecting lugs form corresponding indentations on the exterior wall surfaces of the resulting container. Because of the aforementioned display function of the exterior surface of the yogurt container, maximizing the amount of surface area available for printing information, such as product characteristics, e.g. ingredients, nutritional content, or other required information about the product, is an important consideration, especially where the containers are relatively small, such as for example with the preferred 6 oz. (170 g) yogurt containers. As such, the lugs at the top of the sidewall of the sleeve member restrict the height of the printing that can be received on the container sidewall. In addition, because of the lugs, there are unsightly indentations on the container sidewall that are readily visible to the purchaser. Moreover, because of the radial extent to which the lugs project into the container interior, they can unduly interfere with removing the food product therefrom, e.g. spooning yogurt out from the container.

Therefore, there exists a substantial need for an improved apparatus and method for assembling plastic food containers, defined by a sleeve member and a bottom closure member, that eliminates the need for, and the attendant drawbacks to, the radially inward projecting lugs. The apparatus and method of assembly should be capable of assembling the bottom closure member to the sleeve member to form a food product container that is aesthetically pleasing, is fluid tight and better maximizes the print receiving surface area thereon. In particular, the apparatus and method should be capable of accommodating inaccuracies and misalignment of the container components. Finally, the apparatus and method of assembly needs to assemble the containers relatively quickly so as to be cost efficient especially when compared to the process of spinwelding of the container components.

SUMMARY OF THE INVENTION

One aspect of the present invention provides a manufacturing apparatus for assembling containers. Each of the containers has a body portion with an annular rim configured to be secured to an annular rim of a base portion of the container. The manufacturing apparatus includes a container supporting assembly, at least one tool member, a drive assembly, an oscillator assembly and a suspension assembly. The container supporting assembly supports the body and base portions of at least one container with the annular rim of the base portion engaging the annular rim of the body portion. The drive assembly is connected to the at least one tool member for moving the tool member along a first axis between a first position, wherein the tool member is engaged with the annular rim of one of the body portion and the base portion, and a second position, wherein the tool member is disengaged therefrom. The oscillator assembly is connected to the at least one tool member for oscillating the tool member relative to the container supporting assembly. With the tool member in the first position, oscillation of the tool member, via the oscillator assembly, causes oscillation of the base portion and body portions relative to one another generating enough heat to melt areas of contact between the annular rims to join the base portion and the body portion. The suspension assembly is connected to the at least one tool member for supporting the tool member for pivotal movement about a second axis orthogonal to the first axis. In one preferred embodiment, the manufacturing apparatus is used to assemble a food container for holding flavored yogurt.

Another aspect of the present invention relates to a method of assembling a container having a body portion with an annular rim configured to be secured to an annular rim of a base portion of the container. The method includes supporting the body and base portions of the container in a container supporting assembly with the annular rim of the base portion engaging the annular rim of the body portion. The method of assembly further includes moving a tool member in a first direction along a first axis into engagement with the annular rim of one of the body portion and the base portion of the container. The tool member is pivotable about a second axis orthogonal to the first axis. The tool member is then oscillated which causes oscillation of the body and base portions of the container relative to one another at a sufficiently rapid rate and for a sufficient time to generate enough heat to melt areas of contact between the annular rims of the base and body portions. The areas of contact between the base and body portions are then allowed to cool sufficiently to solidify the areas of contact. In one preferred embodiment, the method of assembling a container is used to assemble a food container for holding flavored yogurt.

By employing an oscillation assembly and tool member for oscillating the base and body portions of the container relative to one another to secure the container components together the need for, and the attendant drawbacks to, the radially inward projecting lugs has been eliminated. Moreover by securing the container components via this oscillation welding process, containers can be assembled and filled more quickly than prior processes resulting in a reduction in the overall costs of manufacture.

DETAILED DESCRIPTION OF THE PREFERRED EMBODIMENTS

Figure 1:
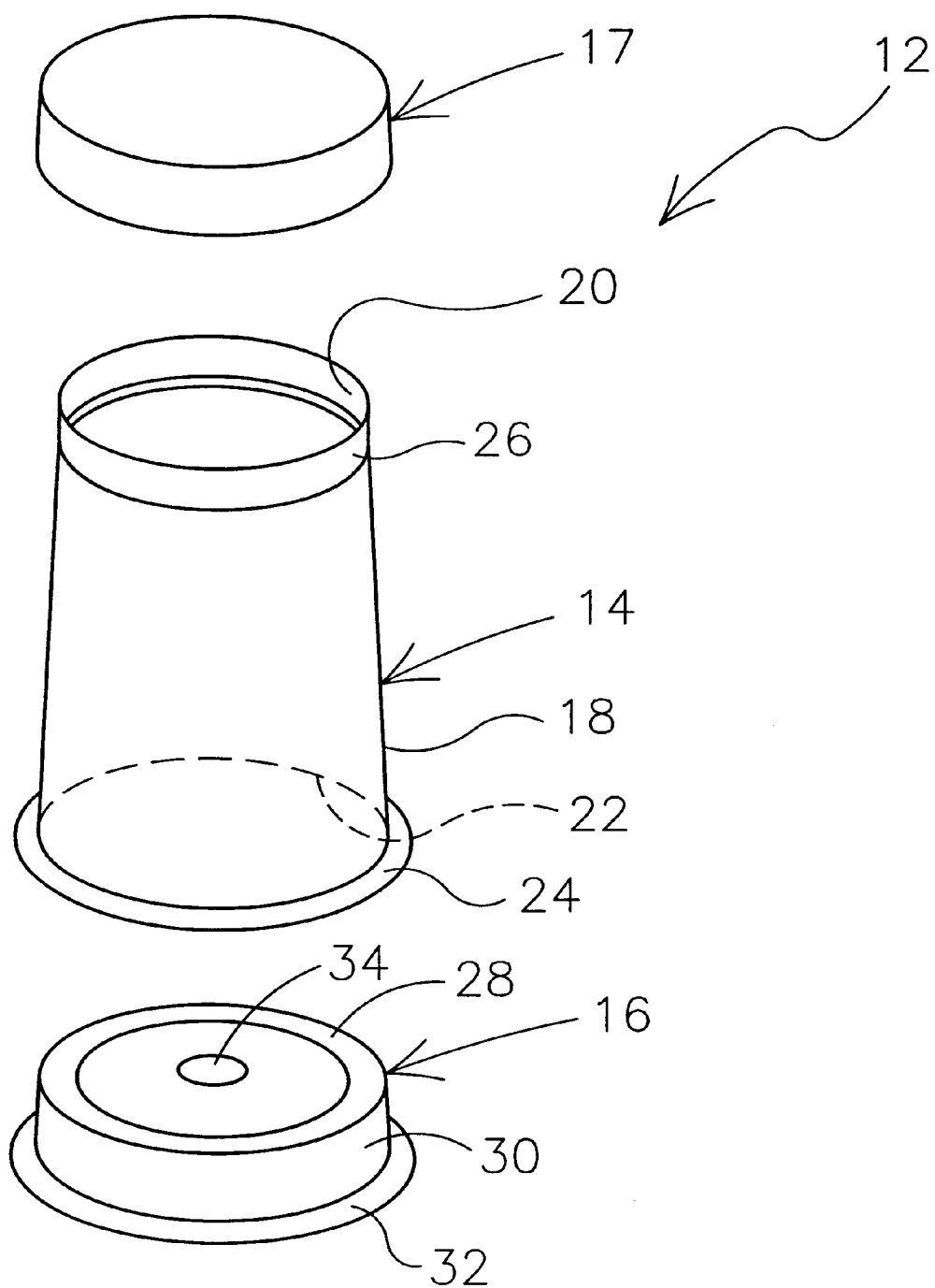
FIG. 1 is a perspective, exploded view of a food container to be assembled by a manufacturing apparatus and method in accordance with the present invention.
Figure 2:
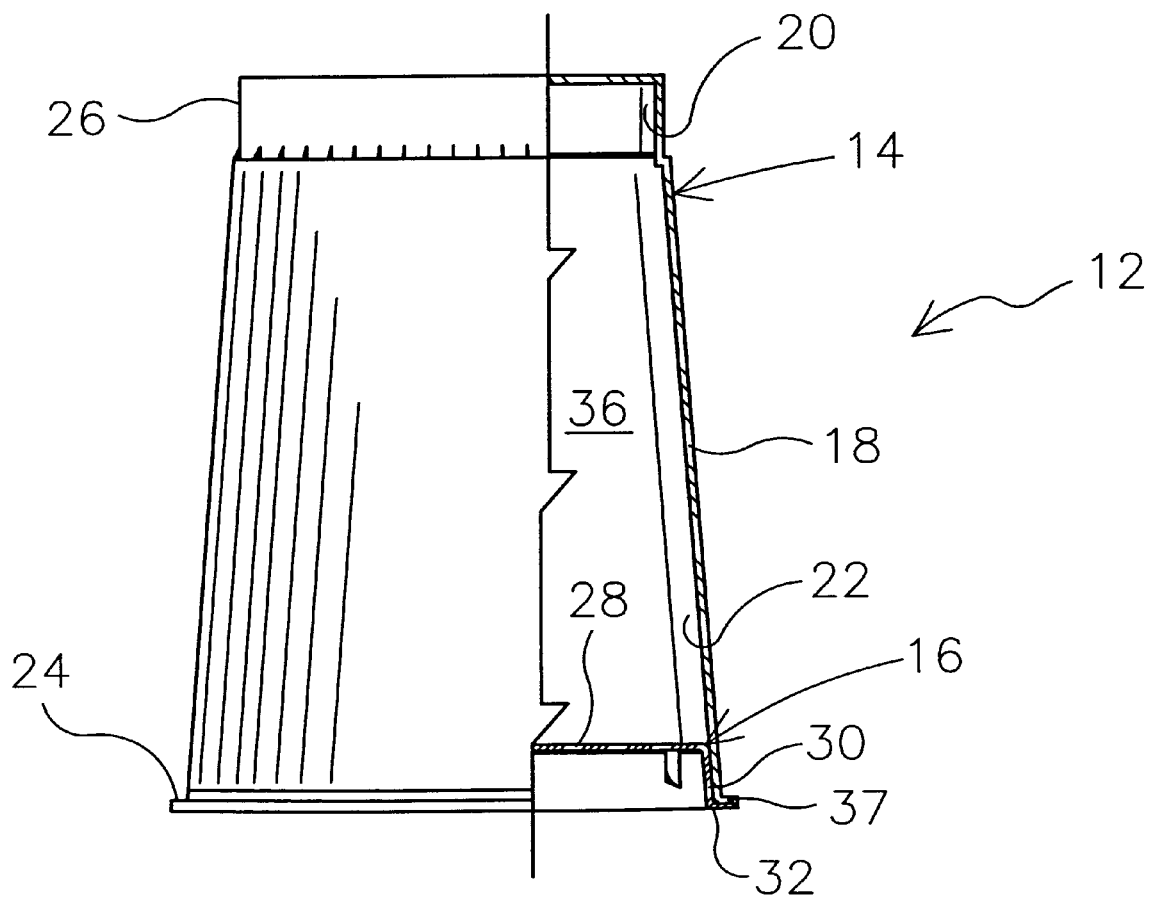
FIG. 2 is a side elevational view, partially in section of an assembled food container as shown in FIG. 1.

FIGS. 3–6 generally illustrate a manufacturing apparatus 10, in accordance with the present invention, for assembling a food container 12 as shown in FIGS. 1 and 2. The food container 12 includes a sleeve member or upper main body portion 14, a lower bottom closure member or base portion 16, and a lid member or seal portion 17. The body portion 14 has a sidewall 18 that is generally frustoconical in shape so that it tapers from a smaller diameter open top 20 to a larger diameter open bottom 22. An annular rim 24 is formed on the sidewall 18 at the larger diameter open bottom 22. The annular rim 24 of the body portion 14 projects radially outward from the sidewall 18. The sidewall 18 of the body portion 14 includes a recessed region 26 at the smaller diameter open top 20 for receiving the seal portion 17. The base portion 16 of the container 12 includes an upper panel wall 28 and a reversed frustoconical shaped sidewall 30 which depends downwardly from a periphery of the upper panel wall 28. A bottom peripheral edge of the frustoconical sidewall 30 of the base portion 16 is formed with an annular rim 32. Similar to the annular rim 24 of the body portion 14, the annular rim 32 of the base portion 16 projects radially outward from the frustoconical sidewall 30. To assist in withstanding drop tests and preventing cracking of the upper panel wall 28 and the frustoconical sidewall 30 of the base portion 16, a raised dome 34 is formed at the center of the panel wall 28. In one preferred embodiment, the body portion 14 and the base portion 16 of the food container 12 can be separately formed from a thermoplastic material using an injection molding process. In this one preferred embodiment, the thermoplastic material from which the body portion 14 and the base portion 16 are formed can be polypropylene.

The preferred application of the container 12 is a container for yogurt, and the exemplary dimensions set forth herein for the container 12 is for a container that is filled with six ounces (i.e., 170 g) of flavored yogurt. However, it will be understood that the size and dimensions of the container 12 can be varied from that described herein and still fall within the scope of the present invention. After the container 12 is filled with flavored yogurt, the open top 20 is sealed by the seal portion 17 which can take the form of a foil seal member. The seal portion 17 can be adhered to the recessed region 26 of the body portion 14 for sealing the yogurt food product in an interior region 36 of the container 12. To open the sealed container 12 and gain access to the yogurt food product in the interior region 36, a person simply uses their fingers to peel the seal portion 17 from the recessed region 26 to expose the open top 20 of the container 12.

A container 12 of this type is disclosed in U.S. patent application Ser. No. 09/119,072, entitled "Plastic Container For Food Products", filed on Jul. 10, 1998, which is a continuation-in-part of U.S. patent application Ser. No. 08/975,149, entitled "Plastic Container For Food Products" filed on Nov. 20, 1997, both of which are assigned to the same assignee as herein and which are incorporated herein in their entirety by reference thereto.

In accordance with the present invention, the base portion 16 is to be attached to the body portion 14 by the manufacturing apparatus 10 so as to form an open top container to be filled with a food product. In practice, the manufacturing apparatus 10 of the present invention ultrasonically bonds or welds the base portion 16 of the container 12 to the body portion 14 of the container 12. As seen best in FIG. 2, the base and body portions 14, 16 that form the container 12 are ultrasonically welded at the areas of contact 37 between the annular rims 24, 32 of the body and base portions 14, 16 as will be more fully described hereinafter.

As seen in FIGS. 3-6, the manufacturing apparatus 10 comprises a container supporting assembly 40, a carrier assembly 42, a drive assembly 44, a tool assembly 46, an oscillator assembly 48 and a suspension assembly 50. The container supporting assembly 40 includes a plurality of container supporting plates 52 (see FIG. 4). Each of the container supporting plates 52 is configured to support at least one and in preferred form a plurality of containers 12 to be assembled. As such, each container supporting plate 52 includes at least one and preferably a plurality of apertures 54, each of which is surrounded by a container retaining ring 56. As seen best in FIGS. 3 and 4, each aperture 54 of the container supporting plate 52 is designed to hold the body portion 14 and base portion 16 of a container 12 to be assembled.

The body portion 14 is held in a respective aperture 54 in an inverted position. In other words, the body portion 14 is positioned such that the smaller diameter open top 20 points down with the annular rim 24 of the body portion 14 resting on a top surface of the respective container retaining ring 56. With the body portion 14 of the container 12 in this position, the base portion 16 is positioned on the body portion 14 also in an inverted orientation. In other words, the frustoconical sidewall 30 of the base portion 16 is received within the interior region 36 of the body portion 14 with the annular rim 32 of the base portion 16 resting on the annular rim 24 of the body portion 14. It bears noting here that the annular rims 24, 32 of the body and base portions 14 and 16 have not as yet been assembled (i.e., welded) together. In addition, although not specifically part of the present invention, the container supporting plates 52 are all identical and are connected together and arranged in a conveyor belt fashion so as to bring successive rows of containers 12 to be assembled into position so that the annular rims 24, 32 of the body and base portions 14, 16 can be ultrasonically welded together.

The container supporting plate 52 supports the containers 12 to be assembled beneath the tool assembly 46. The tool assembly 46 includes a plurality of tool members or ultrasonic horns 60. As is readily apparent from FIGS. 3 and 4, there is one sonic horn 60 for each container 12 to be assembled that is supported within the container supporting plate 52 of the container support assembly 40. Each sonic horn 60 includes a main body portion 62 and an enlarged head portion 64. Each enlarged head portion 64 is configured to contact the annular rim 32 of a base portion 16 which rests upon the annular rim 24 of a body portion 14 which in turn is resting upon the retaining ring 56 of the container supporting plate 52.

Figure 3:
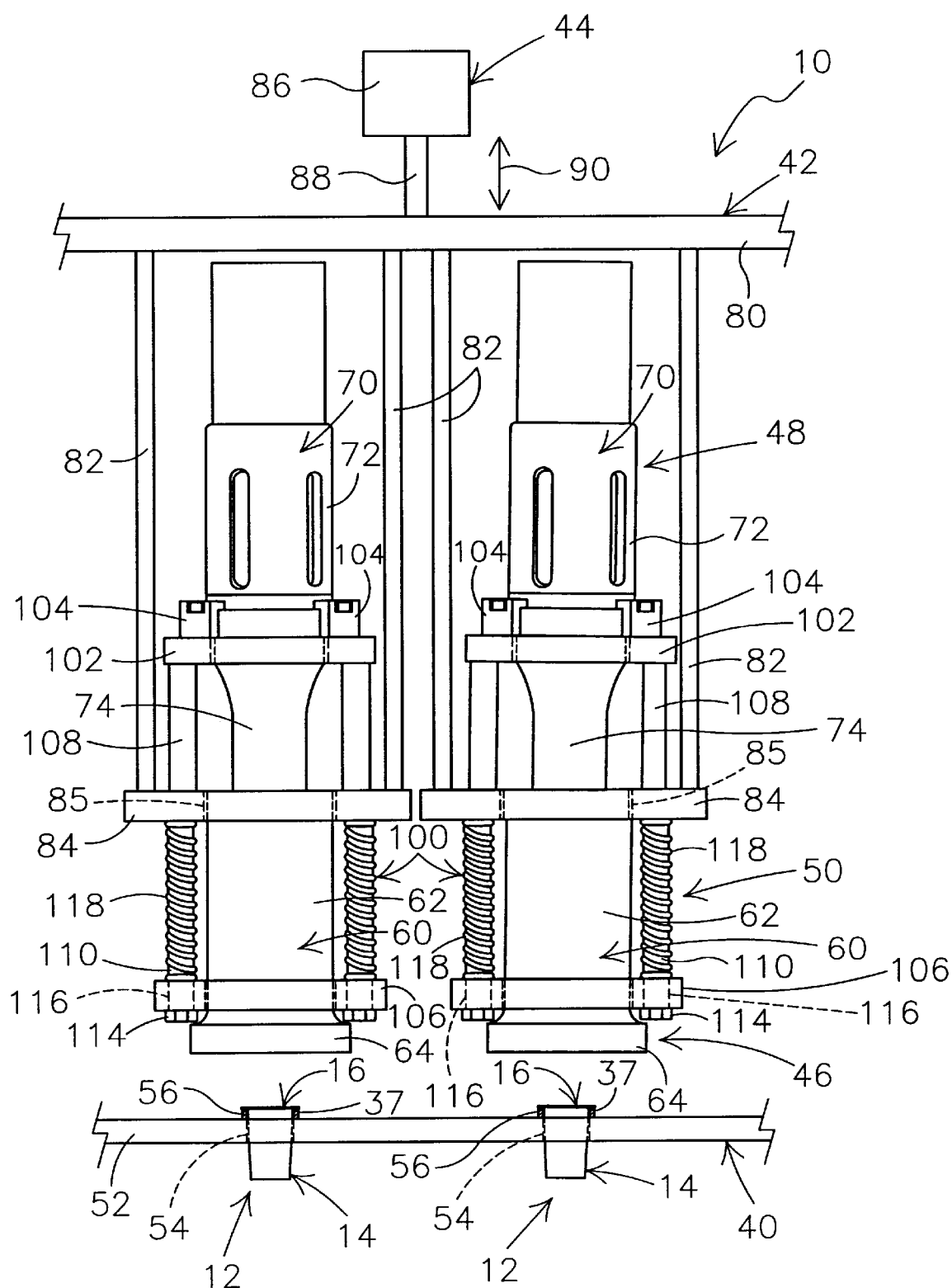
FIG. 3 is a side elevational view of the manufacturing apparatus for assembling the food container shown in FIG. 1 in accordance with the present invention, with a pair of ultrasonic horns of the manufacturing apparatus shown in an initial position disengaged from the food containers.

As seen best in FIG. 3, the sonic horns 60 are attached to oscillation mechanisms 70 that define the oscillator assembly 48. There is one oscillation mechanism 70 connected to each of the sonic horns 60. Each oscillation mechanism 70 includes an ultrasonic converter 72 for converting in a known manner electrical energy to ultrasonic oscillation energy (i.e., high frequency vibrations). An ultrasonic booster 74 is coupled between each ultrasonic converter 72 and each sonic horn 60. The ultrasonic booster 74 amplifies, in a known manner, the ultrasonic energy produced by the ultrasonic converter 72. The ultrasonic converters 72 together with the ultrasonic boosters 74 cause the sonic horns 60 to oscillate (i.e., vibrate) at a high frequency (i.e., at approximately 20,000 cycles per second) relative to the container supporting plates 52.

The sonic horns 60 together with the oscillation mechanisms 70 are linearly movable along a first axis 76 (FIG. 4) together in unison between an initial disengaged position (FIG. 3), wherein the enlarged heads 64 of the sonic horns 60 are disengaged from (i.e., spaced from) the annular rims 32 of the base portions 16, and an engaged position (FIG. 4), wherein the heads 64 of the sonic horns 60 are engaged with the annular rims 32. When the enlarged heads 64 of the sonic horns 60 are engaged with the annular rims 32 of the base portions 16 of the containers 12 to be assembled (see FIGS. 5 and 6), oscillation of the sonic horns 60, via operation of the oscillation mechanisms 70, causes oscillation of the base and body portions 16, 14 relative to one another. In particular, oscillation of the sonic horns 60 causes the base portions 16 to oscillate relative to the body portions 14 so as to generate sufficient heat over a sufficient time to melt the areas of contact 37 between the annular rims 32, 24 to join the base portion 16 to the body portion 14 forming a water tight seal in contact area 37 around the circumference thereof.

Figure 4:
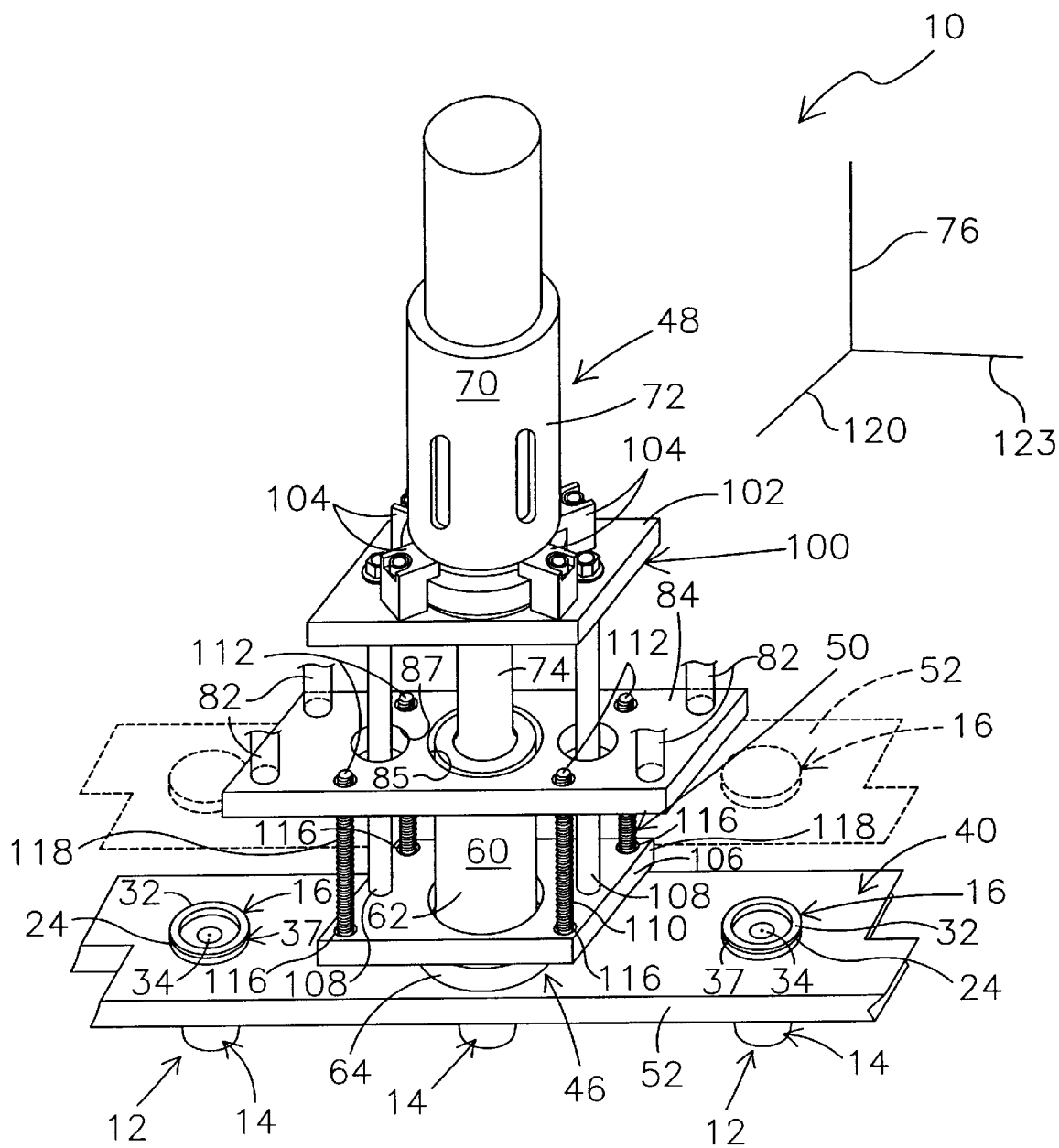
FIG. 4 is perspective view of the manufacturing apparatus of FIG. 3 illustrating a single ultrasonic horn in a position engaged with the food container to be assembled in accordance with the present invention.
Figure 5:
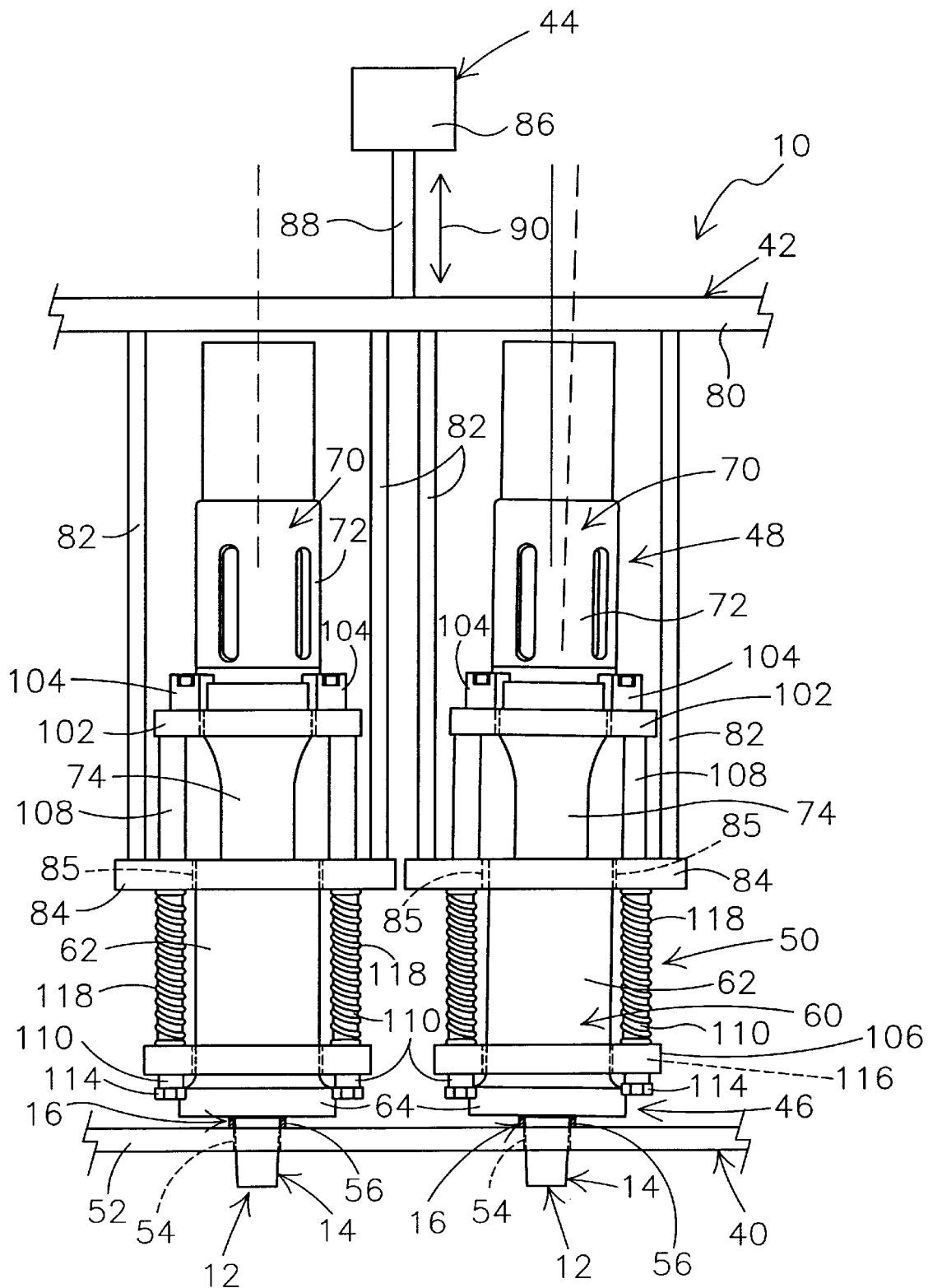
FIG. 5 is a side elevational view of the manufacturing apparatus similar to FIG. 3, with the pair of ultrasonic horns of the manufacturing apparatus shown in a position engaged with the food containers.

As seen best in FIGS. 3 and 5, the sonic horns 60 and the oscillation mechanism 70 are mounted to the carrier assembly 42 through the suspension assembly 50. The carrier assembly 42 is that part of the manufacturing apparatus 10 that is linearly movable along the first axis 76 for moving the sonic horns 60 together with the oscillation mechanisms 70 between the disengaged and engaged positions. The carrier assembly 42 includes a main beam member 80 that extends above the oscillation mechanisms 70. Extending beneath the main beam member 80 are a plurality of carrier mounting poles 82 which are secured to a plurality of carrier mounting plates 84. As is clear from FIGS. 3, 5 and 6, there is one carrier mounting plate 84 for each sonic horn 60/oscillation mechanism 70 combination. In turn, there are four carrier mounting poles 82 secured between the main beam member 80 and each of the carrier mounting plates 84. The main beam 80, the poles 82 and the plates 84 form a rigid structure that is movable as a single unit linearly along the first axis 76 between the disengaged and engaged positions via operation of the drive assembly 44. As seen best in FIG. 4, each of the carrier mounting plates 84 includes a large main through opening 85 that accommodates the main portion 62 of the sonic horn 60. The large main through opening 85 allows the sonic horn 60 to move freely relative to the carrier mounting plate 84 as will be explained more fully below. In addition, each of the carrier mounting plates 84 includes a pair of small through openings 87 the purpose of which will be made clear below.

Figure 6:
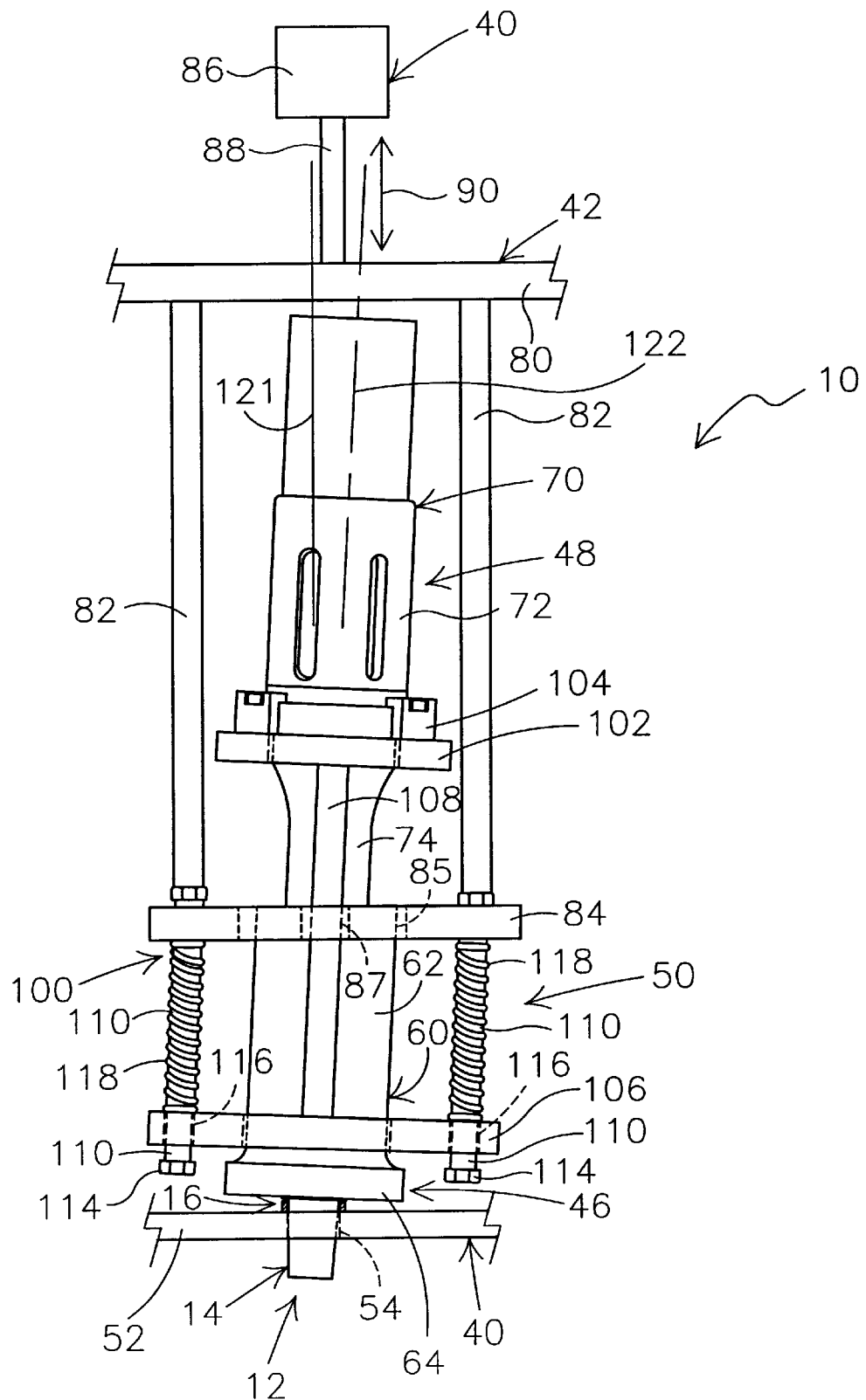
FIG. 6 is an end elevational view of an ultrasonic horn of the manufacturing apparatus in accordance with the present invention.

As seen in FIGS. 3, 5 and 6, the drive assembly 44 includes a drive motor 86, such as a servo motor, and a drive linkage 88 which operationally couples the drive motor 86 to the main beam 80 of the carrier assembly 42. In one preferred embodiment, the drive linkage 88 can take the form of a screw drive that engages a cooperating threaded portion in the main beam 80. Operation of the drive motor 86 results in linear movement (as represented by double headed arrow 90) of the carrier assembly 42 and therewith the combination of the sonic horns 60/oscillation mechanisms 70 between the engaged and disengaged positions.

As seen in FIGS. 4–6, each of the sonic horn 60/oscillation mechanism 70 combination is coupled to a respective carrier mounting plate 84 via its own suspension mechanism 100. The suspension mechanisms 100 for all the sonic horn 60/oscillation mechanism 70 combinations together define the suspension assembly 50. Each suspension mechanism 100 includes an upper suspension plate 102 to which the sonic horn 60 is mounted via the oscillation mechanism 70. The upper suspension plate 102 includes a plurality (i.e., four) mounting brackets 104 that engage the ultrasonic converter 72 to secure the oscillation mechanism 70 and thereby the sonic horn 60 to the upper suspension plate 102. Each suspension mechanism 100 further includes a lower suspension plate 106 which is secured to the upper suspension plate 102 via a pair of suspension posts 108. The suspension posts 108 are fixed against relative movement with respect to the upper and lower suspension plates 102, 106. The carrier mounting plate 84 is positioned between the upper and lower suspension plates 102, 106 with the suspension posts 108 extending through the small through openings 87 in the carrier mounting plate 84. As such, the suspension posts 108 are freely movable relative to the carrier mounting plate 84.

As seen best in FIGS. 3 and 4, each lower suspension plate 106 includes a plurality (i.e., four) suspension elements or rods 110 that are evenly spaced about the sonic horn 60. As seen best in FIG. 4, the rods 110 are fixed at their first or upper ends 112 to the carrier mounting plate 84 via a threaded interconnection so as to prevent relative movement between the rods 110 and the carrier mounting plate 84. As further illustrated in FIG. 4, second or lower ends 114 of the rods 110 extend freely through holes 116 in the lower suspension plate 106 so as to permit relative movement between the rods 110 and the lower suspension plate 106. Each of the rods 110 includes a biasing element, such as a coil spring 118 that surrounds the rod 110. The coil springs 118 act between the carrier mounting plate 84 and the lower suspension plate 106 to bias the sonic horns 60 to a lowered starting position as seen in FIG. 3 with the sonic horns 60 disengaged from the annular rims 32 of the base portions of the containers 12 to be assembled. Each coil spring 118 and rod 110 combination defines a suspension member of the suspension mechanism 100.

As is best seen in FIG. 5, each combination of a sonic horn 60, oscillation mechanism 70, and suspension plates 102, 106 and posts 108 of the suspension mechanism 100 is freely movable as a single unit relative to the carrier mounting plate 84 of the carrier assembly 42. This is made possible by the openings 85, 87 in the carrier mounting plate 84 and the through holes 116 in the lower suspension plate 106 that freely and movably accommodate the sonic horn 60, suspension posts 108 and rods 110, respectively. This freely movable arrangement between the carrier assembly 42 and the combination of the sonic horn 60, oscillation mechanism 70, and suspension plates 102, 106 and posts 108 of suspension mechanism 100 allows the sonic horn 60 (as well as the oscillation mechanism 100) to freely move pivotally about a second axis 120 (FIG. 4) that is orthogonal to the first axis 76. This pivotal movement about the second axis 120 is illustrated best in FIG. 5 and can be seen by the difference between the vertical continuous line 121 and the dashed centerline 122 of the sonic horn 60. This difference between the vertical continuous line 121 and the dashed centerline 122 is greatly exaggerated in FIG. 5 to more clearly illustrate the pivotal movement of the sonic horn 60 about the second axis 120. In actuality, the difference between the vertical continuous line 121 and the dashed centerline 122 of the sonic horn 60 is 0.5 degrees at a maximum.

In addition, this freely movable arrangement between the carrier assembly 42 and the combination of the sonic horn 60, oscillation mechanism 70, and suspension plates 102, 106 and posts 108 of suspension mechanism 100 allows the sonic horn 60 (as well as the oscillation mechanism 100) to freely move pivotally about a third axis 123 (FIG. 4) that is orthogonal to the first axis 76 and the second axis 120. This pivotal movement about the third axis 123 is illustrated best in FIG. 6 and can once again be seen by the difference between the vertical continuous line 121 and the dashed centerline 122 of the sonic horn. Like FIG. 5, this difference between the vertical continuous line 121 and the dashed centerline 122 is greatly exaggerated in FIG. 6 to more clearly illustrate the pivotal movement of the sonic horn 60 about the third axis 123. In actuality, the difference between the vertical continuous line 121 and the dashed centerline 122 of the sonic horn 60 is 0.5 degrees at a maximum.

Moreover, this freely movable arrangement between the carrier assembly 42 and the combination of the sonic horn 60, oscillation mechanism 70, and suspension plates 102, 106 and posts 108 of suspension mechanism 100 allows the sonic horn 60 (as well as the oscillation mechanism 100) to freely move linearly along the first axis 76 (FIG. 4). This linear movement along the first axis 76 is illustrated best in FIGS. 3 and 5 and can be seen by the difference between the positions of the second ends 114 of the rods 110 between these two figures.

The pivotal movement of each sonic horn 60 about the second and third axes 120, 123, and the linear movement of each sonic horn 60 linearly along the first axis 76 allows each sonic horn 60 to be freely movable relative to the carrier assembly 42 and the other sonic horns 60, such that each sonic horn 60 in the first position (FIG. 5) can engage the entire annular rim 32 of the base portion 14 to accommodate inaccuracies in the annular rims 32 and 24 (as a result of the injection molding process used to form the base and body portions 16, 14) and misalignment of the container 12 in the container supporting plate 52.

In addition, the pivotal movement of each sonic horn 60 about the second and third axes 120, 123, and the linear movement of each sonic horn 60 linearly along the first axis 76 allows each sonic horn 60 to further compensate for inaccuracies in the components that make up the manufacturing apparatus 10 and inaccuracies in the manufacturing apparatus 10 itself. For example, although the components that go into the manufacturing apparatus 10 are formed, machined, and assembled to a high degree of precision, these same assembled components can still exhibit imperfections that affect the trueness (i.e., level and plumb alignment) of the manufacturing apparatus 10 overall. The independent pivotal and linear movement of each sonic horn 60 as described above can compensate for these trueness and alignment affecting minor imperfections. Moreover, usage of the manufacturing apparatus 10 over time can cause flexing and stressing of these same components which can also affect the overall trueness of the manufacturing apparatus 10. Once again, the independent pivotal and linear movement of each sonic horn 60 can compensate for this level and/or plumb misalignment that is a result of the general usage of the manufacturing apparatus 10 over time.

FIGS. 7A–7E illustrate the method of operation of the manufacturing apparatus 10 to ultrasonically assemble (i.e., attach) the container base portion 16 to the container body portion 14. In particular, FIGS. 7A–7E illustrate the ultrasonic welding (i.e., melting) of the respective annular rims 32 and 24 of the base and body portions 16, 14 of a container 12 to be assembled to form welded areas of contact 37 between the rims 32, 24. As seen best in FIGS. 3 and 7A, the method of assembly begins with the sonic horns 60 in the disengaged position (i.e., spaced from and directly above) from the container base portions 16 and the container body portions 14 to be assembled. As previously described, the container body portions 14 are supported in the respective apertures 54 of the container supporting plate 52 in an inverted orientation. The container base portions 16 are supported on the respective body portions 14 also in an inverted orientation with the annular rims 32 of the base portions resting on the annular rims 24 of the body portions 14.

Figure 7A:
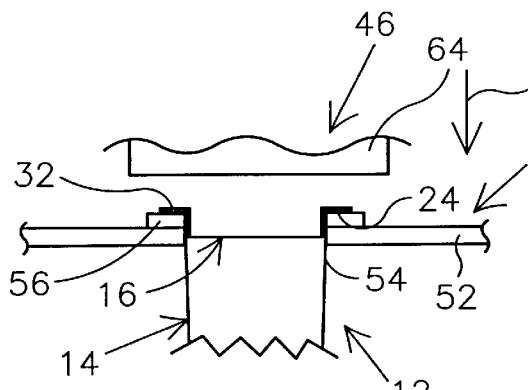
FIGS. 7A–7E are partial side elevational views illustrating the method of assembling the food container of FIG. 1 in accordance with the present invention.
Figure 7B:
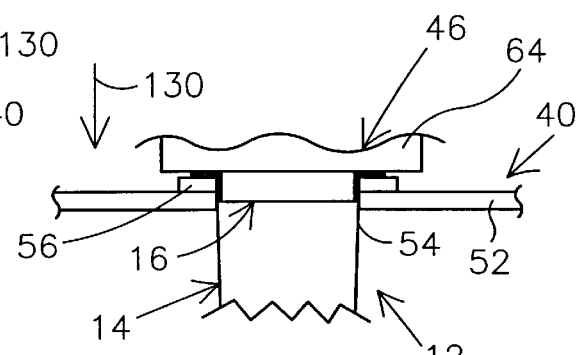

At this time, as seen in FIG. 7B, the drive means 44 is activated. In particular, the drive motor 86 is activated to move (as represented by directional arrow 130) the carrier assembly 42 and thereby the sonic horns 60 from the disengaged position of FIGS. 3 and 7A to the engaged position of FIGS. 5, 6 and 7B. In the engaged position, the enlarged heads 64 of the sonic horns 60 are in contact with the annular rims 32 of the base portions 16. As previously described, the sonic horns 60 are each, separately, freely movable relative to the carrier assembly 42. In particular, each sonic horn 60 can individually pivot freely about the second and third axes 120, 123 and move linearly along the first axis 76 to accommodate inaccuracies in the annular rims 32 and 24 (as a result of the injection molding process used to form the base and body portions 16, 14) and misalignment of the container 12 in the container supporting plate 52. This free movement of the sonic horns 60 insures that each sonic horn 60 is in complete and uniform contact with its respective annular rim 32 of the base portion 16. By insuring complete and uniform contact of the sonic horns 60 with the annular rims 32 of the base portions 16, a leak proof weld between the annular rims 24 and 32 of the body and base portions 14 and 16 is insured. Moreover, this complete and uniform contact of the sonic horns 60 with the annular rims 32 insures uniform contact between the annular rims 24, 32 of the body and base portions 14, 16. This uniform contact results in a uniform ultrasonic weld at the areas of contact 37 that is exhibits high burst strength. In addition, this uniform contact results in an ultrasonic weld that is aesthetically (i.e., visually) pleasing because of the absence of welding flash normally associated with an improperly formed (i.e., non-uniform) weld.

Figure 7C:
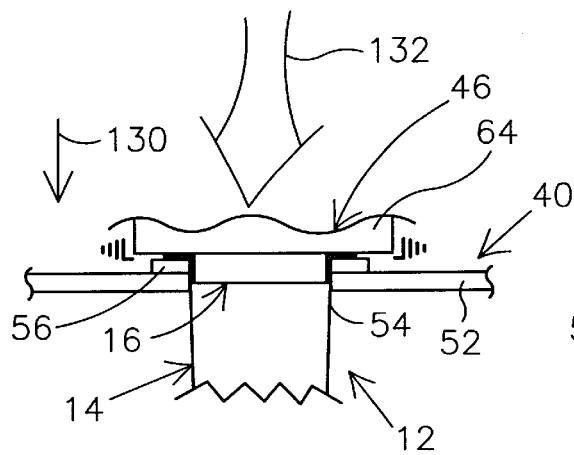

As seen best in FIG. 7C, the drive motor 86 continues to operate to further lower the carrier assembly 42. The drive assembly 44 can continue to lower the carrier assembly 42 because the openings 116 in the lower suspension plates 106 allow the rods 110 and the carrier assembly 42 to move, along the first axis 76 relative to the lower suspension plates 106 and the sonic horns 60, against the bias of the coil springs 118. Continued operation of the drive motor 86 causes ever increasing compression of the coil springs 118 which in turn causes the coil springs 118 to exert ever increasing force (as represented by the pressure arrow 132) on the sonic horns 60 and thereby increased pressure on the annular rims 32 of the container base portions 16. From the point of contact of the sonic horns 60 with the annular rims 32 of the container base portions 16 through the ever increasing pressure caused by the coil springs 118 the oscillation mechanisms 70 operate to oscillate in a linear motion along the first axis 76 at approximately 20,000 cycles per second or greater. Oscillation (i.e., high frequency vibration) of the oscillation mechanisms 70 causes the sonic horns 60 to oscillate the container base portions 16 relative to the container body portions 14. In particular, the annular rims 32 of the base portions are oscillated relative to the annular rims 24 of the body portions 14 so as to generate sufficient heat over a sufficient time to melt the areas of contact 37 between the annular rims 32, 24 to join the container base portion 16 to the container body portion 14.

Figure 7D:
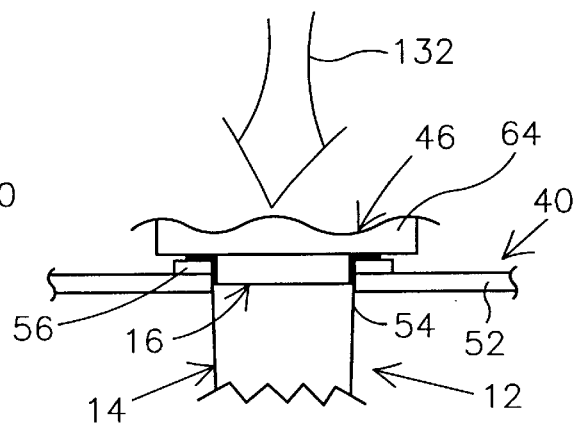
Figure 7E:
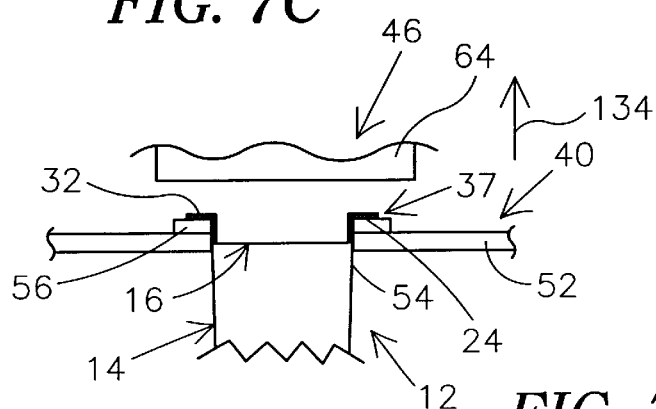

As seen best in FIG. 7D, once the areas of contact 37 between the annular rims 32, 24 has melted, oscillation of the sonic horns 60 and operation of the drive assembly 44 ceases. At this time a constant pressure, which is caused by the coil springs 118, is maintained against the annular rims 32, 24 and the areas of contact 37 between the annular rims 32, 24 of the container base and body portions 16, 14 are allowed to cool for a sufficient period of time to solidify the areas of contact 37. As seen best in FIG. 7E, once the areas of contact 37 have solidified, the drive motor 86 of the drive assembly 44 is activated to raise (as represented by directional arrow 134) the carrier assembly 42 and move the sonic horns 60 from the engaged position to the disengaged position. This completes the assembly of the base and body portions 16, 14 to form the food containers 12. The containers 12 are now ready to be turned right side up, filled with flavored yogurt and sealed via seal portions 17.

In accordance with the present invention, the ultrasonic bonding manufacturing apparatus 10 for ultrasonically welding together container base and body portions 16, 14 provides a significant advantage over prior spinwelding devices. In particular, a significant advantage is found in the speed of operation of the ultrasonic welding manufacturing apparatus 10 and the elimination of specialized equipment to engage the projecting lugs of the prior spinwelded container portions. In addition, by providing each sonic horn 60 with a suspension mechanism 100 that allows each sonic horn 60 to freely move independent of the other sonic horns 60, the sonic horns 60 are each capable of accommodating inaccuracies in the annular rims 32 and 24 (as a result of the injection molding process used to form the base and body portions 16, 14) and misalignment of the container 12 in the container supporting plate 52. By accommodating these inaccuracies and this misalignment, the manufacturing apparatus 10 and in particular, the sonic horns 60 can produce more uniform containers 12 that are fluid tight and aesthetically pleasing. Finally, with the elimination of the need for spinwelding projecting lugs, the exterior surface of the container 12 can be smooth over substantially its entire extent providing a large uninterrupted, smooth area for receiving printing thereon.

Although the present invention has been described with reference to preferred embodiments, workers skilled in the art will recognize that changes may be made in form and detail without departing from the spirit and scope of the present invention.

What is claimed is:

1. A method of assembling a container having a body portion with an annular rim configured to be secured to an annular rim of a base portion of the container, the method comprising the steps of:
   supporting the body and base portions of the container in a container supporting means with the annular rim of the base portion engaging the annular rim of the body portion;
   moving a tool means in a first direction along a first axis into engagement with the annular rim of one of the body portion and the base portion of the container, the tool means being pivotable about a second axis orthogonal to the first axis;
   oscillating the tool means so as to oscillate the body and base portions of the container relative to one another at a sufficiently rapid rate and for a sufficient time to generate enough heat to melt areas of contact between the annular rims of the base and body portions;
   allowing the areas of contact between the base and body portions to cool sufficiently to solidify the areas of contact.

2. The method of claim 1 wherein the tool means is pivotable about a third axis orthogonal to the first and second axes.

3. The method of claim 2 wherein the tool means is linearly movable along the first axis, and wherein the pivotal movement of the tool means about the second and third axes and linear movement of the tool means along the first axis allows the tool means to be freely movable such that in the first position, the tool means can engage the entire annular rim of the one body portion and base portion to as to accommodate inaccuracies in the annular rims of the base and body portions and misalignment of the container in the container supporting means.

4. The method of claim 1 wherein the step of oscillating the tool means includes:
   applying pressure to the annular rims of the base and body portions while oscillating the base and body portions relative to one another.

5. The method of claim 4 wherein the step of applying pressure to the annular rims includes:
   continuously increasing the pressure applied to the annular rims of the base and body portions while oscillating the base and body portions relative to one another.

6. The method of claim 1 wherein the step of allowing the areas of contact between the annular rims of the base and body portions to cool includes:
   applying pressure to the annular rims of the base and body portions while allowing the areas of contact between the base and body portions to cool.

7. The method of claim 1, and further including:
   moving the tool means in a second direction along the first axis to disengage the tool means from the annular rim of one of the body portion and the base portion to allow the container to be removed from the container supporting means after the areas of contact between the annular rims of the base and body portions have cooled sufficiently to solidify the areas of contact.

8. The method of claim 1 wherein the tool means is engaged with the annular rim of the base portion such that the base portion is oscillated relative to the body portion of the container.

9. The method of claim 1 wherein the oscillating step is performed at a frequency of about 20,000 cycles per second or greater.

10. The method of claim 1 wherein at least one of the base portion and the body portion of the container is made of a thermoplastic material.

11. The method of claim 10 wherein both the base portion and the body portion of the container are made of a thermoplastic material.

12. The method of claim 11 wherein the base portion and the body portion of the container are each made of the same thermoplastic material.

13. The method of claim 12 wherein the thermoplastic material is polypropylene.

14. A manufacturing apparatus for assembling containers, each of the containers having a body portion with an annular rim configured to be secured to an annular rim of a base portion of the container, the manufacturing apparatus comprising:
   container supporting means for supporting the body and base portions of at least one container with the annular rim of the base portion engaging the annular rim of the body portion;
   at least one tool means;
   drive means for moving the at least one tool means along a first axis between a first position, wherein the at least one tool means is engaged with the annular rim of one of the body portion and the base portion, and a second position, wherein the at least one tool means is disengaged therefrom;
   oscillator means connected to the at least one tool means for oscillating the at least one tool means relative to the container supporting means, such that when the at least one tool means is in the first position, oscillation of the at least one tool means, via the oscillator means, causes oscillation of the base portion and body portion relative to one another generating enough heat to melt areas of contact between the annular rims to join the base portion and the body portion; and
   suspension means connected to the at least one tool means for supporting the at least one tool means for pivotal movement about a second axis orthogonal to the first axis.

15. The manufacturing apparatus of claim 14 wherein the suspension means is connected to the at least one tool means for supporting the at least one tool means for pivotal movement about a third axis orthogonal to the second axis.

16. The manufacturing apparatus of claim 14 wherein the suspension means is connected to the at least one tool means for supporting the at least one tool means for pivotal movement about a third axis orthogonal to the first axis.

17. The manufacturing apparatus of claim 16 wherein the third axis is orthogonal to the second axis.

18. The manufacturing apparatus of claim 17, and further including:
   a carrier assembly for supporting the at least one tool means, the suspension means connecting the at least one tool means to the carrier assembly to allow pivotal movement of the at least one tool means relative to the carrier assembly about the second and third axes and linear movement of the tool means relative to the carrier assembly along the first axis, and
   wherein the pivotal movement of the at least one tool means about the second and third axes and linear movement of the at least one tool means along the first axis allows the at least one tool means to be freely movable such that in the first position, the at least one tool means can engage the entire annular rim of the one body portion and base portion to as to accommodate inaccuracies in the annular rims of the base and body portions and misalignment of the container in the container supporting means.

19. The manufacturing apparatus of claim 18 wherein the suspension means includes at least one suspension mechanism corresponding to the at least one tool means.

20. The manufacturing apparatus of claim 19 wherein the at least one suspension mechanism includes at least two suspension members, each of the suspension members including:
   a suspension element coupled to the carrier assembly so as to be fixed against relative movement with respect to the carrier assembly, the suspension element being movable relative to the at least one tool means to allow pivotal movement of the at least one tool means relative to the carrier assembly about the second and third axes and linear movement of the tool means relative to the carrier assembly along the first axis; and
   a biasing element acting between the at least one tool means and the carrier assembly for biasing the at least one tool means to a starting position.

21. The manufacturing apparatus of claim 20 wherein there are four suspension members evenly spaced relative to one another.

22. The manufacturing apparatus of claim 21 wherein the suspension element is a rod, and wherein the biasing element is a coil spring that extends about the rod.

23. The manufacturing apparatus of claim 20 wherein the suspension mechanism further includes:
   an upper suspension plate to which the at least one tool means is mounted;
   a lower suspension plate for movably receiving the at least two suspension elements so as to permit movement of the lower suspension plate relative to the at least two suspension elements; and
   a plurality of suspension posts coupling the lower suspension plate to the upper suspension plate, the plurality of suspension posts being fixed against relative movement with respect to the upper and lower suspension plates.

24. The manufacturing apparatus of claim 23 wherein the carrier assembly includes a carrier mounting plate to which the at least two suspension elements are fixed against relative movement, such that the upper and lower suspension plates, and the plurality of suspension posts are movable relative to the carrier mounting plate and the at least two suspension elements to allow pivotal movement of the at least one tool means relative to the carrier assembly about the second and third axes and linear movement of the tool means relative to the carrier assembly along the first axis.

25. The manufacturing apparatus of claim 24 wherein the carrier mounting plate is positioned between the upper and lower suspension plates, and wherein the carrier mounting plate defines a plurality of openings through which the plurality of suspension posts and the at least one tool means extend to allow relative movement between the suspension rods and at least one tool means and the carrier mounting plate.

26. The manufacturing apparatus of claim 20 wherein the drive means is connected to the carrier assembly such that operation of the drive means causes linear movement of the carrier assembly and therewith linear movement of the at least one tool means along the first axis between the first and second positions.

27. The manufacturing apparatus of claim 26 wherein the drive means includes:
   a servo motor; and
   a drive linkage operationally coupling the servo motor to the carrier assembly.

28. The manufacturing apparatus of claim 26 wherein the at least one tool means includes a plurality of tool members, and wherein linear movement along the first axis of the carrier assembly, via operation of the drive assembly, causes the tool members to move in unison between the first and second positions.

29. The manufacturing apparatus of claim 28 wherein each of the tool members in the first position is configured to engage the annular rim of one of the body portion and the base portion of one respective container of the containers.

30. The manufacturing apparatus of claim 29 wherein each of the tool members in the first position engages the annular rim of the base portion of the respective one container.

31. The manufacturing apparatus of claim 29 wherein the oscillator means includes:
   a plurality of oscillation mechanisms, wherein one oscillation mechanism of the plurality of oscillation mechanisms is connected to each of the tool members, such that when the tool members are in the first position, oscillation of the tool members, via the oscillation mechanisms, causes oscillation of the base portions and body portions relative to one another generating enough heat to melt areas of contact between the annular rims to join the base portions and the body portions of the respective containers.

32. The manufacturing apparatus of claim 31 wherein oscillation of the tool members, via the oscillation mechanisms, causes oscillation of the base portions relative to body portions of the respective containers which are stationary.

33. The manufacturing apparatus of claim 31 wherein the oscillation mechanisms cause each of the tool members to oscillate in a linear motion.

34. The manufacturing apparatus of claim 33 wherein the linear motion is along the first axis.

35. The manufacturing apparatus of claim 31 wherein each of the tool members is a sonic horn, and wherein each oscillation mechanism includes an ultrasonic converter for converting electrical energy to ultrasonic oscillation energy.

36. The manufacturing apparatus of claim 35 wherein each oscillation mechanism further includes a ultrasonic booster for coupling the sonic horn to the ultrasonic converter, the ultrasonic booster amplifying the ultrasonic oscillation energy produced by the ultrasonic converter.

37. The manufacturing apparatus of claim 36 wherein the ultrasonic oscillation energy produced by the oscillation mechanisms causes each of the sonic horns to oscillate in a linear motion along the first axis.

38. The manufacturing apparatus of claim 37 wherein each of the sonic horns oscillates at about 20,000 cycles per second or greater.

39. The manufacturing apparatus of claim 31 wherein the at least one suspension mechanism includes a plurality of suspension mechanisms, and wherein one suspension mechanism of the plurality of suspension mechanisms is connected to each of the tool members.

* * * * *